Feb. 11, 1936.  I. E. COFFEY  2,030,745
AUTOMATIC AUXILIARY FUEL SUPPLY FOR INTERNAL COMBUSTION ENGINES
Filed Dec. 6, 1932
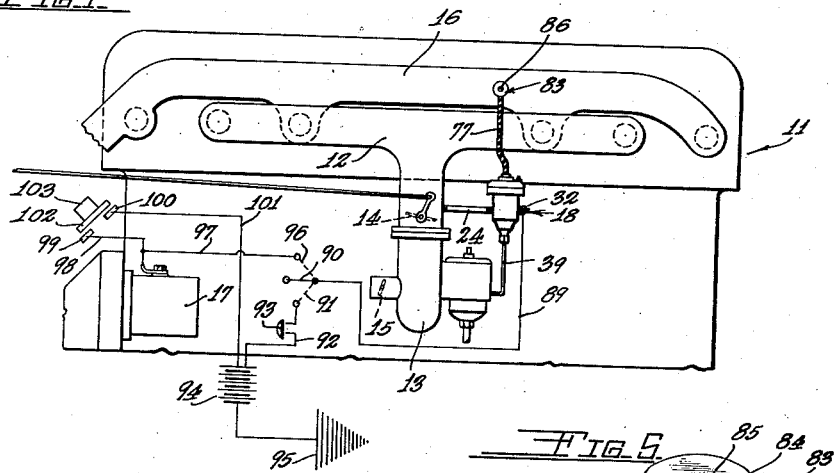

Patented Feb. 11, 1936

2,030,745

UNITED STATES PATENT OFFICE 2,030,745

AUTOMATIC AUXILIARY FUEL SUPPLY FOR INTERNAL COMBUSTION ENGINES

Irven E. Coffey, Playa Del Rey, Calif.

Application December 6, 1932, Serial No. 645,960

37 Claims. (Cl. 123—127)

My present invention may be considered as a further development of that of my patent application for Automatic fuel vaporizer and auxiliary fuel supply for internal combustion engines, filed January 28, 1932, Serial No. 589,436.

An object and feature of my invention is the injection of auxiliary heated fuel gas in addition to the vapors created in the carburetor when starting a cold engine and maintaining this auxiliary fuel supply until the engine becomes sufficiently heated to operate satisfactorily without the additional vaporized fuel.

In connection with the operation of internal combustion engines it is well known that in starting the fuel drawn through the ordinary carburetor is insufficiently gasified and hence it is necessary to what is termed "choke" the carburetor in order to increase the relative amount of fuel in relation to the air. This has many disadvantages, such as providing a wet mixture in the engine and forming vapors which do not provide the proper explosive mixture.

With my present invention I omit the use of a choke in starting an engine, the throttle of course being manipulated to provide an adequate suction for drawing the liquid fuel into the carburetor for carbureting with air. In addition to this I supply an auxiliary heated fuel gas with but a small air content. This auxiliary gas is obtained by gasifying through the action of heat the liquid fuel drawn preferably from the carburetor, and this gasified fuel after being heated is admitted to the intake manifold and mixed with the air and vapors drawn through the carburetor.

Another object and feature of my invention is to provide the heat for gasifying the liquid fuel with an electric current passing through an electric heater mounted adjacent a needle valve, this needle valve having no connection with that of the carburetor. This needle valve is regulated as to its opening by the suction of the engine created through the reciprocation of the pistons by the starting motor and admits a jet of liquid fuel, which fuel comes in contact with the electrical heating element, which element may be energized either slightly prior or during the operation of the starting motor. This heat causes the liquid fuel to immediately gasify with a little air added thereto, hence a rich dry gas is drawn into the intake manifold and mixes with the fuel and air vapors drawn through the carburetor, further gasifying the constituent of the fuel drawn through the carburetor and furnishing the engine with a better mixture for firing.

Another object of my invention is the use of a thermostatic control to close the needle valve of the auxiliary fuel supply device when the engine becomes sufficiently heated to operate without the necessity of this additional fuel. This is done by drawing air through the auxiliary fuel supply device, which air is obtained from a heater mounted on the exhaust manifold. The air passes around a piston which controls the needle valve, initially the air being drawn into the intake manifold, thus creating constant suction of air, the leakage past the piston however is insignificant compared with the amount of air which is drawn through the carburetor under all conditions of operation. The heat of the air operates the thermostatic control to close the needle valve when the engine is sufficiently heated to operate properly without the auxiliary fuel supply.

Another object and feature of my invention in connection with the thermostatic control is that I have dual control elements for the needle valve, one being designed to regulate the needle valve at the first slow speeds of idling, and the other thermostat is designed to close the needle valve at the higher speeds developed when the engine is hot and operating under its own power.

The slow speed thermostat control is designed to regulate the needle valve when the engine is turned over at slow speeds when operated by the starter and when it is idling after being started. With the use of my auxiliary fuel the engine can immediately idle after starting; and in this idling the throttle valve is nearly closed and the first thermostatic control is designed to close the needle valve on initial heating at idling speeds. The second thermostat control designed for operating the needle valve when the engine speed is high and hence the throttle open with a manifold depression the needle valve has greater play of operation, and on heating of the secondary thermostat control this control is the main element for closing the needle valve. By this construction, should the engine while operating cool to too great an extent, auxiliary fuel may be drawn into the intake manifold, this becoming vaporized by the heat from the exhaust manifold, but in this case there will be no initial heating by the electrical coil which is only intended to function when starting the engine.

My invention is illustrated in connection with the accompanying drawing, in which Fig. 1 is a diagrammatic elevation of an engine with my auxiliary fuel device mounted thereon and showing the electrical circuits in diagram.

Fig. 2 is a vertical section on the line 2—2 of Fig. 3 in the direction of the arrows of the auxiliary fuel supply device.

Fig. 3 is a vertical section on the line 3—3 of Fig. 2 in the direction of the arrows.

Fig. 4 is a horizontal section on the line 4—4 of Fig. 2 in the direction of the arrows.

Fig. 5 is a perspective view of a hot air collector for attachment to the exhaust manifold.

In the illustration of Fig. 1 the engine block is designated by the numeral 11 having an intake manifold 12 connected to the carburetor 13. This carburetor has a throttle valve 14 and a choke valve 15, which latter, by my invention need not be used. The exhaust manifold is indicated at 16. A starting motor is indicated at 17.

My auxiliary fuel supply device designated by the assembling numeral 18 has a heater housing 19, this being provided with a cylindrical bore 20 and a reduced bore 21 at the lower end. This lower end has an externally threaded section 22 and the upper end is provided with a recess 23. Connected to one side of the heater housing there is a gas pipe 24 which leads to the intake manifold. In the cylindrical bore there is a cylindrical insulator 25 having a port 26 for registering with the tube 24. Inside of the insulator there is a heating coil 27, one end 28 being grounded, and the other end being connected to the head of a conducting bolt 29. This bolt passes through an insulating sleeve 30 in the wall of the structure 19, there being an insulating washer 31 and terminal nuts 32 to which an electric lead wire may be connected.

The device is provided with a valve designated by the assembling numeral 33, this having a valve tube 34 fitting in the bore 21, this bore preferably having a shouldered enlargement 35 at the bottom to engage the valve tube 34. The valve tube is provided with a small duct 36 and has a conical valve seat 37. A guide portion 38 extends above the seat.

The fuel pipe 39 is connected to the carburetor below the valve of the carburetor and in such a position to always be able to draw fuel therefrom. This pipe has one end 40 terminating in an enlarged portion 41 of the tube 34 at the bottom. On the pipe 39 there is a ball section 42 which bears against the spherical seat in the lower end of the tube 34 and is engaged by a coupling nut 43 which is threaded on the lower threaded portion 22 of the heater structure. The valve is controlled by means of a needle valve stem 44 which passes through a piston 45, this piston being hollow and having a lower nut 46 which is threaded downwardly on the threaded section of the stem 44 to the ends of the threads. The piston fits in the bore 20. The stem has a second nut 47 also threaded thereon and there is a compression spring 48 between these nuts. At the top of the stem there is a head 49 threaded thereon with a lock nut 50. The head and lock nut may be adjusted on the threaded end of the stem.

The first or slow speed thermostatic control device designated by the assembly numeral 51 has a thermostatic bar 52 formed of bi-metallic metal, such bar having a pair of kinks 53 to allow for freer expansion and is provided with a center perforation 54 through which the neck portion of the head 49 may freely operate. A light coiled compression spring 55 bears on the top of the thermostatic bar 52 and engages underneath the head 49, thus maintaining an upward movement on the valve stem 44.

The thermostatic bar 52 is adjustably mounted by means of two adjusting screws 56 and 57, these being threaded through an enlarged head section 58 at the top of the heater. This enlarged section has a pair of recesses 59 each of which has a coil spring 60, the spring supporting a washer 61. The thermostatic bar 52 is provided adjacent each end with a perforation 62 so that a neck 63 on a nut 64 threaded on the screw may extend freely through the perforation, the small end of the nut engaging the washer 61. Thus, by threading the nuts 64 up and down on the screws 56 the desired position for the thermostatic bar 52 may be obtained, and this is adjusted so that the engine will idle immediately after being started without requiring the engine to run at a high speed until warmed up.

The second or high speed thermostatic control is designated by the assembling numeral 65. This is formed by looped thermostatic control bars 66, the loop having a horizontal section 67 with a perforation 68 which engages on a neck of the nut 47 threaded on the stem 44. The upper end of the neck is preferably riveted over the perforation or the thermostatic bar section rigidly secured at its center point to the nut 47. At the end of the horizontal section 67 there are two loops 69 at opposite sides of the device and extending inwardly there are two freely movable arms 70, these terminating at 70' and do not contact either with the neck portion of the head 49 or with the threaded portion of the stem. They are free to engage the under side of the thermostatic bar 52 of the first thermostatic control.

In order to secure the piston on the stem a ring 71 is fitted in a groove on the stem, thus securing the base of the piston between this ring and the nut 46.

A cap 72 has a horizontal top 73 and a depending flange 74 which fits in an annular groove 75 on the outer peripheral edge of the head section 58. This cap has a nipple end 76 to which is secured a flexible air hose 77. At the base of the nipple there is a first recess 78 with a shoulder 79, and against this shoulder fits a gauze screen 80 held in place by a split ring 81 fitting in an annular groove in an enlarged portion 82 of the recess 78. The cap is held in place by screw 57 and nut 57'.

The hose 77 is designed to conduct hot air which is preferably heated by the exhaust manifold. For this purpose I preferably employ a heat collector 83, (note Fig. 5). This comprises a cup 84 with a perforation 85 through which a screw or bolt 86 extends and is threaded into the manifold. A neck 87 is provided for the end of the hose 77 and a series of notches 88 through the edge of the cup allow entrance of air, and therefore, this air being confined within the cup and on the surface of the exhaust manifold becomes heated to a sufficient extent.

The electrical circuits for the fuel heater are as follows: A lead wire 89 extends from the terminals 32 and this has a two-way switch 90 connected thereto. The switch, when in the position indicated at 91, connects through a lead 92 having a push button 93 to the battery 94. One side of this battery is grounded at 95. When the switch is moved to the position indicated at 96 it connects to a lead 97 which is joined to the lead 98 which connects between the starting motor 17 and the starting motor contact 99. The other starting motor contact 100 connects by a lead 101 to the battery 94. The contacts 99 and 100 are illustrated as closed by a bridging piece 102 operated by a push button 103 which may be operated either by foot or hand.

In accordance with these circuits, if the switch 91 connects with the push button 93, then the driver of the car may depress this push button and energize the heating coil 27 in the auxiliary fuel device, this coil, as above mentioned, being grounded. Then after the driver judges that the coil is sufficiently heated he may actuate the starter button and close the circuit to the starting motor, the motor starting the engine, or, as an alternative, the driver may connect the switch 90 in the position indicated at 96, making a parallel circuit through the starter motor and the heating coil of the auxiliary fuel device. Thus, the motor and the heating coil are energized when the starting switch for the motor is closed. This latter circuit does not preheat the heating coil prior to actuation of the starting of the engine. This latter circuit is quite desirable for starting in warm weather, but for starting the engine in extremely cold weather it is desirable to preheat the coil before the starting motor is energized and to maintain the heat by holding the push button 93 closed for a considerable length of time until the engine becomes satisfactorily warm.

The general manner of operation and function of my invention is as follows:

As above described, when the starting motor is energized the heating coil 27 should also be heated by being brought into a circuit either prior to or at the time of energizing the starting motor. When the engine is being turned over by the starting motor the suction in the intake manifold is not very great, therefore, such suction has practically no effect on pulling down the piston 45. As above described, a certain amount of air is sucked past this piston as it has a fairly easy operating fit in the cylindrical bore 20. When the device is cold on first starting the engine and the thermostatic strips are cold the needle valve formed by the seat 37 and the point of the stem 44 is open to a considerable degree. After the engine is started as with my device the throttle may be left closed in idling position and a considerable suction is developed in the intake manifold, creating a relatively high vacuum. This suction pulls down on the piston 45 and at the same time compressing the light compression spring 55 which is seated on top of the thermostatic bar 52 and engages under the head 49 of the nut at the top of the valve stem. This action nearly closes the needle valve, the adjustment having been made for slow speed or idling by means of adjusting the nuts 64 above mentioned on the screws 56 and 57. During this idling action, unless the push button 93 is kept closed, the heating coil 27 will not be heated but when this coil is energized the heat is applied directly to the jet of fuel through the needle valve and immediately gasifies this. Such action takes place when the engine is turned over by the starting motor so that on the initial suction of the engine a dry heated gas is sucked into the intake manifold from the jet chamber of the auxiliary fuel device and this has but little air mixed with it, nothing like enough to start combustion, but this dry gas is immediately mixed with the vapors drawn through the carburetor and improves the mixture entering the engine, allowing a quick start without the necessity of operating the carburetor choke.

After the engine is started and is idling with the throttle closed the spring 55 will become compressed due to the downward suction on the piston 45. If this occurs with the thermostatic bars in a cold condition the bar 52 will be pulled upwardly and out of contact with the ends 70' of the secondary thermostatic control 65. The suction of the engine will therefore regulate the opening of the needle valve, this having been adjusted to the proper opening for idling.

Then, as the engine warms up the first thermostatic device, that is, the bar 52, comes into action by expanding, that is, going downwardly, which allows the piston 45 to move still further down, maintaining the compression of the spring 55. This action will be continued during the gradual heating of the bar 52 until this bar is pulled down sufficiently that the suction of the engine drawing down on the piston 45 causes the needle valve to close.

In accordance with different degrees of atmospheric temperature the bar 52 has different positions, for instance, in cold weather it will be bowed upwardly and in very hot weather bowed downwardly, with intermediate positions according to intermediate temperatures. Therefore, the rapidity or slowness with which the needle valve closes is dependent on the initial temperature which is the atmospheric temperature.

Presuming that both thermostatic controls are sufficiently warmed by the heat from the engine together with that of the atmospheric temperature the higher the temperature the more the bar 52 is moved down but this has apparently little movement, and the higher the temperature the ends 70' of the secondary control 65 are bowed upwardly to a greater extent than when cold. Therefore, should the engine be stopped the needle valve will be at rest in a position dependent on the temperature of the thermostatic controls, which, as above mentioned, depend on the atmospheric temperature together with any increase due to the heat from the engine. If the thermostatic controls are heated to a sufficient degree the bowed secondary control exerts a pressure on the primary control and forces the nut 47 downwardly, thus bringing the needle of the stem in a closed position with its seat, and hence, when the engine is sufficiently hot and the car is started no auxiliary fuel is used, but if the thermostatic control should be slightly cool the needle valve will be open to a degree depending on the temperature of the thermostatic controls.

The device therefore operates in all conditions of engine starting to meter an auxiliary supply of heated and gasified dry fuel in accordance with the requirements of the engine from a temperature standpoint.

The action of the secondary thermostatic control for instance, after the engine has been started and has been idling and then the engine is accelerated with the thermostatic controls still cool the lessened suction due to an increased opening of the throttle allows the piston 45 to move upwardly, this being due to the action of the compression spring 55, and hence, an auxiliary supply of fuel is metered under various amounts of suction to the intake manifold. During this condition, unless the circuit to the heater coil 27 is closed, this heater will be inoperative and the device will function to meter auxiliary fuel as required by the engine.

As both the thermostatic controls become heated above atmospheric temperature due to hot air being drawn from adjacent the exhaust manifold the first action is to cause the downward bowing of the bar 52 and the expansion or spreading apart of the looped control 65. This will bring the end 70' of the secondary control 65 into engagement with the bar 52. As this bar is removable the nut 47 is forced downwardly, thus shifting the stem 44 down and gradually bringing the needle closer to its seat until it finally makes a closure and permits no more fuel to pass.

An important feature of my invention is even if the engine should be hot but the thermostatic strips cool off sufficiently to slightly open the needle valve then during the high suction when the throttle is in a position for idling auxiliary fuel will be drawn into the rarefied air and thus quickly change into a dry gas. This is due to the fact that the connection of the pipe 24 is always located between the throttle valve and the intake valves of the engine.

The seating of the needle valve may be adjusted to be closed when the engine is operating at an economic temperature by removing the cap 72 and turning the nuts 49 and 50 which are jammed on the stem and hence do not rotate on the stem but act to rotate the stem. The nut 47 is held from rotation by means of the lower section 67 of the secondary thermostat 65, which sections are confined by the shoulders 104 in the recess 23. This adjustment is made when the thermostatic strips are heated to an adequate degree and when it is desired that these thermostats will maintain the needle valve closed.

A further accurate adjustment may be made by substituting tubes 34, these being easily removable and substitutes provided with different sized valve openings or seats. Thus, a slight change in size of the opening or seat with the stem needle on the stem will give different results in the valve needle valve opening by both the engine suction and the thermostatic control.

Another important feature of my invention is that it is very responsive to the requirements of the engine for auxiliary fuel due to the conditions of the vacuum on the intake manifold, for instance, at similar stages of opening of the needle valve manifestly if the suction is greater a considerably larger amount of fuel is drawn through the needle valve than when the throttle is open to a greater extent and should the suction or vacuum in the intake manifold be materially decreased.

Various changes may be made in the principles of my invention without departing from the spirit thereof, as set forth in the description, drawing and claims.

I claim:

1. In a device as described, the combination of an engine having a fuel intake subject to engine suction, an auxiliary valve having means to supply fuel thereto, a connection from the valve to the intake, means acted upon by the suction of the engine tending to close the said valve, a spring means tending to open the valve, and a thermostatic means operable to both open and close the valve in accordance with the temperature, an electrical heating element in the valve between the fuel opening of the valve and the connection to the intake, and electrical connections to energize said heating element.

2. In a device as described and claimed in claim 1, a hot air connection from the exhaust manifold to the valve, there being an air passage from the said hot air connection to the connection to the fuel supply of the engine.

3. In a device as described, the combination of an engine having an intake manifold, a main fuel supply for the throttle valve, an auxiliary fuel supply means including a valve having a valve seat and a valve stem operating therewith forming a needle valve, a fuel connection to the valve for liquid fuel, a fuel gas connection from the valve to the intake manifold connected between the throttle and the engine, an inlet for air to the valve, and a movable means actuated by suction and connected to the valve stem to regulate the opening of the valve.

4. In a device as described and claimed in claim 3, a thermostatic bar directly connected to the valve stem and positioned to close the valve on heating of the bar and to positively open the valve on cooling of the bar.

5. In a device as described and claimed in claim 3, a first thermostatic bar means forming an operating connection between said bar and the stem to permit closing of the valve due to suction, and a second thermostatic control bar operatively connected to the stem to positively close the valve on the heating of the said second bar.

6. An auxiliary fuel supply device comprising a valve housing having a valve therein with a stem to open and close the valve, a suction connection from the valve housing, an air inlet to the housing subject to suction, a suction means controlled by the suction to operate the stem and regulate the valve opening, and in addition a thermostatic control means connected to the stem to also regulate the position of the stem and the opening of the valve, said suction means permitting inlet of air.

7. An auxiliary fuel supply device having a valve housing with a valve therein for liquid fuel, a movable stem to regulate the degree of opening or closing of the valve, a suction connection from the valve to an engine intake, an air inlet to the valve, a suction operated means in the air inlet and having a connection to the stem whereby on changes of suction to the suction connection of the engine the valve opening may be regulated, a first thermostatic control device having a yieldable connection to the stem to permit changing of the position of the suction operated means in the valve housing in accordance with differences in temperature, and a second thermostatic control means having a direct connection to the valve stem to additionally control the degree of valve opening in accordance with changes of temperature.

8. An auxiliary fuel supply device having a valve housing with a cylindrical bore, a suction connection from the bore to an engine intake, a valve at one end of the bore for liquid fuel, a piston at the opposite end of the bore, a stem having a connection to the piston and extending through the bore to regulate the opening and closing of the valve, a first thermostatic bar having adjustable mountings at each end for regulation and having an opening therethrough with the stem extending through said opening, a spring on the said bar having a separate connection to the stem, and a second thermostatic control bar having a loop, the lower end of the bar having an adjustable connection to the stem, the upper ends of the bar being adapted to engage the first thermostatic bar, the said piston being adapted for operation due to the suction of the engine.

9. An auxiliary fuel supply device having a valve housing with a valve therein, a suction connection from the housing, an inlet for air subject to suction, an electric heating unit in the housing to heat fuel drawn through the valve, a suction controlled means permitting the inlet of air to control the valve, a first and a second thermostatic control device regulating opening of the valve, the first device being operative on a relatively high vacuum and the second device on a relatively lesser vacuum of the said suction connection.

10. In a device as described, the combination of an engine having an intake fuel supply manifold subject to vacuum, an auxiliary fuel supply device having a chamber, a connection from said chamber to the manifold, an auxiliary liquid fuel valve leading to said chamber, a hot air connecting means to said chamber, a movable device subject to suction to regulate the opening of the auxiliary fuel valve in accordance with the vacuum in the intake manifold, the hot air from the hot air connection mixing with the auxiliary fuel.

11. In a device as described in claim 10, a thermostatic control means located in the path of the hot air to said chamber, said means being connected to the valve to control the valve in accordance with the temperature of the air admitted to said chamber.

12. In a device as described in claim 10, a first thermostatic control means operatively connected to the valve to partly close the valve on an increase of temperature from a cold condition, a second thermostatic control means co-acting with the first thermostatic means and connected to the valve to close the valve on development of a high temperature.

13. In a device as described, the combination of an engine having an intake manifold subject to suction, an auxiliary fuel device having a chamber, an air connection for suction between said chamber and the intake manifold, a liquid fuel jet valve discharging into said chamber, a suction actuated device connected to said valve to regulate the opening of the valve in accordance with the suction in said chamber, a thermostatic control strip connected to said valve to regulate the valve in accordance with varying changes of temperature, and means to adjust the position of the thermostatic strip to regulate the valve opening on idling of the engine, the connection between the thermostatic strip and the valve including a valve stem and a light spring between the valve stem and the thermostatic strip.

14. In a device as described in claim 13, a second thermostatic strip having one end connected to the valve stem and the opposite end co-acting with the first strip to compress said light spring and close the valve on a further increase of temperature.

15. In a device as described, the combination of an engine having an intake fuel supply manifold subject to a vacuum, an auxiliary fuel supply device having a chamber, a connection from the chamber to the manifold, an air connection to the chamber for flow of air through said connection to the manifold under all conditions of vacuum, an auxiliary liquid fuel valve leading to said chamber and having a valve closure element and means regulated by the suction of the engine to close or partly close the said element in relation to the valve.

16. In a device as described in claim 15, a hollow structure connected to the chamber structure, a hot air connection for the flow of air to the chamber, a thermostatic control device in said hollow space and subject to the hot air and connected to the said valve element to regulate the movement of said element in accordance with the temperature of said thermostatic device.

17. In a device as described in claim 15, said chamber having an electric heating device therein to heat both the jet of auxiliary fuel and the air flowing through the said connection to the manifold.

18. In a device as described, a combination of an engine having an intake fuel supply manifold subject to vacuum, an auxiliary fuel supply device having a chamber and a hollow space above the said chamber, a connection from the chamber to the manifold, a hot air connection from the hollow space to a heated part of the engine, there being an air passage under all conditions of suction through the hollow space and the chamber to the said connection, an auxiliary valve for liquid fuel, a movable stem to control said valve, a suction operative means connected to the stem to regulate the position of the stem in accordance with the suction of the engine.

19. In a device as described in claim 18, a first thermostatic control device mounted in the said hollow space and connected to the stem to regulate the position of the stem in accordance with the temperature of the air in the said hollow space.

20. In a device as described in claim 18, a first thermostatic control device mounted in the said hollow space and connected to the stem to regulate the position of the stem in accordance with the temperature of the air in the said hollow space, a second thermostatic control device in the said hollow space and operatively connected to the stem, said second device being adapted to react with the said first thermostatic device to increase the movement of the stem and closure of the valve on increased temperature of air in the said hollow space.

21. In a device as described in claim 18, the valve having a tubular valve seat, the stem having a needle forming a closure with the seat, and an electric heating coil in the said chamber.

22. In a device as described, a combination of an engine having an intake fuel supply manifold subject to vacuum, an auxiliary fuel supply device having a cylindrical bore and a chamber and a structure forming a hollow space above the bore, an air connection from the chamber to the intake manifold, a hot air connection from the hollow space to a heated part of the engine, a valve in the lower part of the chamber having a valve seat and a stem to regulate the opening of the valve, a piston in the said bore connected to the stem and said piston having a loose fit permitting air flow under all conditions of vacuum in the manifold through the connection to the manifold, a first thermostatic control device mounted in the said hollow space and having a resilient connection to the stem to regulate the position of the stem in accordance with the temperature in the said space and in accordance with the varying suction in the said chamber.

23. In a device as described in claim 22, the thermostatic control device comprising a thermostatic strip, the mounting for said device comprising a pair of screws and means to adjust the position of the strip on the said screws.

24. In a device as described in claim 22, a second thermostatic control device comprising a looped strip having one portion connected to the stem and a free end positioned on expansion by heat to engage the first thermostatic device.

25. In a device as described in claim 22, a valve having a replaceable tube with a small bore forming the seat and the stem having a needle point to engage the said bore.

26. In a device as described in claim 22, a valve having a replaceable tube with a small bore forming the seat and the stem having a needle point to engage the said bore and an electric heating coil in the said chamber positioned to heat a jet of fuel passing through the said valve.

27. In a device as described, a combination of an engine having an intake fuel supply manifold subject to vacuum, an auxiliary fuel supply device having a structure with a chamber, a cylindrical bore at one end and a liquid fuel valve at the opposite end with a stem regulating opening of the said valve, the said device having a hollow space with a hot air connection to a heated part of the engine, a connection from the said chamber to the intake manifold, a piston having a loose fit in the bore and providing an air passage from the said space to the said chamber under all conditions of vacuum, said piston being connected to the stem, the stem having a head, a first thermostatic strip mounted on opposite sides in the said space and a light spring between the said strip and the said head.

28. In a device as described in claim 27, a mounting for the thermostatic strip comprising a pair of screws secured in said hollow space and operatively connected to the opposite ends of the said strip to regulate the position of the strip for an idling condition of the engine.

29. In a device as described in claim 27, a second thermostatic strip having a pair of loops, the center portion of said latter strip being adjustably secured to the said stem and having its free ends positioned on expansion to engage the under side of the first thermostatic strip.

30. In a device as described, in which an engine has an intake fuel supply manifold subject to vacuum, combined with an auxiliary fuel supply device having a structure with a chamber, a connection from the chamber to the manifold, an air passage to the chamber for air flow dependent upon the suction in the manifold, a jet valve discharging liquid fuel into the chamber, means to regulate the opening of said valve responsive to the suction in the manifold and an electric heating means in the chamber to heat both the jet of fuel and the air passing through such chamber.

31. In a device as described in claim 30, a structure connected to the said device and having a hollow space, a hot air connection to said space, the passage to the chamber leading from said space and a thermostatic control device in the said space and operatively connected to the said valve.

32. In a device as described in which an engine has an intake fuel supply manifold subject to vacuum combined with an auxiliary fuel supply device having a liquid fuel valve, a suction operating device to regulate opening of said valve, a first thermostatic control device operatively connected to the valve to regulate the degree of opening of the valve when the engine is cold and when partly heated and means to adjust the thermostatic device to supply auxiliary liquid fuel for idling when the engine is cold and to cut out such fuel when the engine is hot.

33. In a device as described in claim 32, a secondary thermostatic control device having a mounting in relation to the valve and to the first thermostatic device, to actuate the valve at higher temperatures and less suction, to shut off the auxiliary fuel supply.

34. In a device as described, in which an engine has an intake fuel supply manifold subject to vacuum combined with an auxiliary fuel device having a fuel valve with a control stem and a connection from said device to the manifold, a movable means subject to vacuum to regulate the stem, a first thermostatic control device having a yieldable connection to the stem to permit the stem having a slight movement subject to suction.

35. In a device as described in claim 34, a second thermostatic control device having a connection to the stem at one portion and an engageable connection with the first thermostatic device on expansion due to increased temperature.

36. In a device as described in which an engine has an intake fuel supply manifold subject to vacuum combined with an auxiliary fuel device having a fuel valve with a control stem, a connection from the valve to the manifold, a suction operative means connected to the stem, a first thermostatic strip, a light spring between said strip and the stem to permit closing movement, means to regulate the position of the first thermostatic strip in relation to the stem.

37. In a device as described in claim 36, a second thermostatic strip in the form of a loop having one end connected to the stem and the other end positioned to engage the first thermostatic strip on expansion.

IRVEN E. COFFEY.